(12) United States Patent
Rao

(10) Patent No.: US 12,261,165 B2
(45) Date of Patent: Mar. 25, 2025

(54) ELECTRONIC CIRCUITS INCLUDING HYBRID VOLTAGE THRESHOLD LOGICAL ENTITIES

(71) Applicant: INTERNATIONAL BUSINESS MACHINES CORPORATION, Armonk, NY (US)

(72) Inventor: Rahul M. Rao, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 703 days.

(21) Appl. No.: 17/388,121

(22) Filed: Jul. 29, 2021

(65) Prior Publication Data
US 2023/0035394 A1 Feb. 2, 2023

(51) Int. Cl.
*H01L 27/02* (2006.01)
*G06F 30/343* (2020.01)

(52) U.S. Cl.
CPC ........ *H01L 27/0207* (2013.01); *G06F 30/343* (2020.01)

(58) Field of Classification Search
CPC ............... H01L 27/0207; G06F 30/343; G06F 2119/06; G06F 2119/12
See application file for complete search history.

(56) References Cited

U.S. PATENT DOCUMENTS

| | | | |
|---|---|---|---|
| 7,281,230 B2 | 10/2007 | Chung et al. | |
| 7,679,414 B1 * | 3/2010 | Ecker | ................. H03H 11/265 326/85 |
| 7,716,612 B1 * | 5/2010 | Gupta | ................. G06F 30/30 716/132 |
| 9,317,641 B2 | 4/2016 | Chowdhury et al. | |
| 9,401,362 B2 | 7/2016 | Zang | |
| 10,276,575 B2 | 4/2019 | Walke et al. | |
| 11,043,947 B1 * | 6/2021 | Balakrishnan | ... H03K 19/00384 |
| 2006/0206845 A1 * | 9/2006 | Rao | ........................ G06F 30/39 703/19 |

(Continued)

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

(Continued)

*Primary Examiner* — Jack Chiang
*Assistant Examiner* — Aric Lin
(74) *Attorney, Agent, or Firm* — Teddi Maranzano, Esq.; Kevin P. Radigan, Esq.; Heslin Rothenberg Farley & Mesiti P.C.

(57) ABSTRACT

Fabrication of an electronic circuit is facilitated by providing a computer tool to enhance design of the electronic circuit to meet a design criteria. The computer tool facilitates obtaining one or more hybrid logical entities, where a hybrid logical entity includes a pull-up circuit and a pull-down circuit formed of transistors with different transistor types for pull-up versus pull-down, and different voltage thresholds for pull-up versus pull-down. Further, the facilitating includes incorporating the hybrid logical entity into the electronic circuit design to produce a revised electronic circuit design. The method further includes initiating manufacture of the electronic circuit pursuant, at least in part, to the revised electronic circuit design.

14 Claims, 11 Drawing Sheets

(56) References Cited

U.S. PATENT DOCUMENTS

2006/0273821 A1* 12/2006 Correale, Jr. ......... G06F 30/327
                                                    326/31
2014/0040845 A1*  2/2014 Zahn ................... G06F 30/3312
                                                    716/114
2019/0371676 A1   12/2019 Bao et al.

OTHER PUBLICATIONS

IBM Publication, "z/Architecture Principles of Operation," IBM® Publication No. SA22-7832-12, 13th Edition, Sep. 2019 (pp. 1-2000).

* cited by examiner

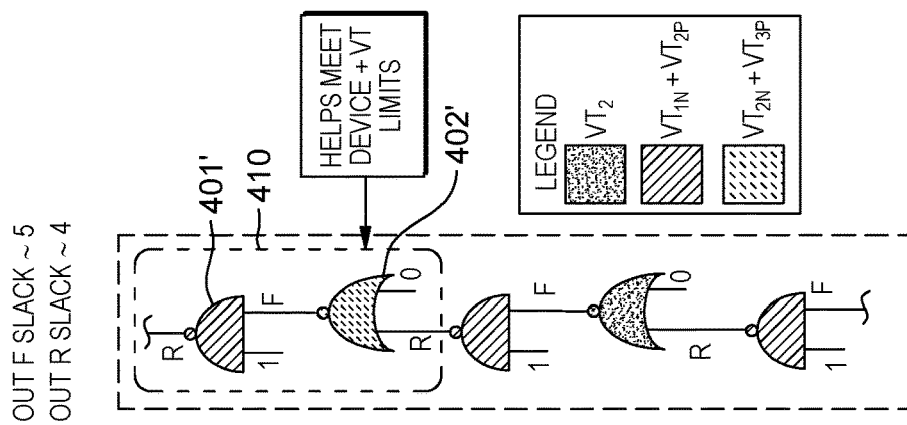
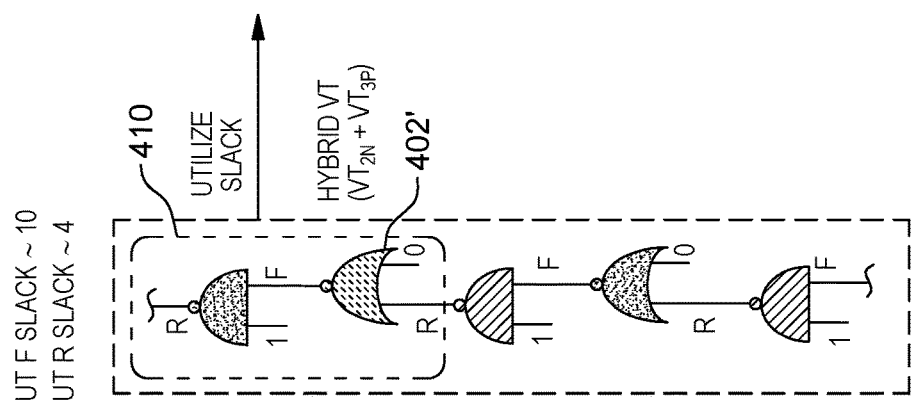
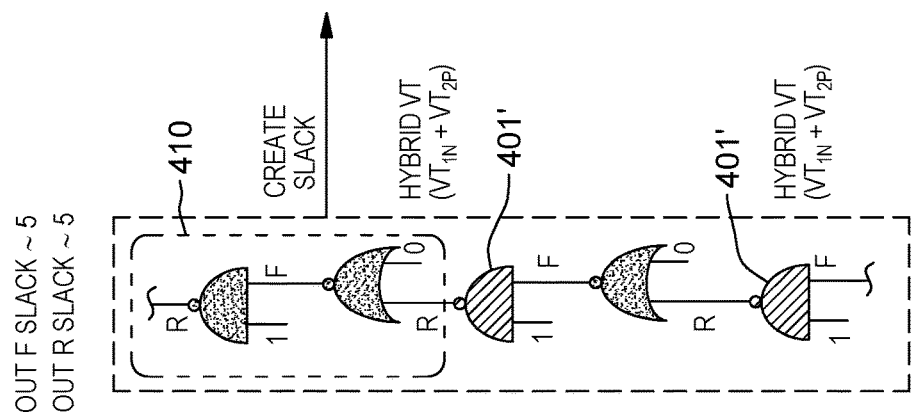
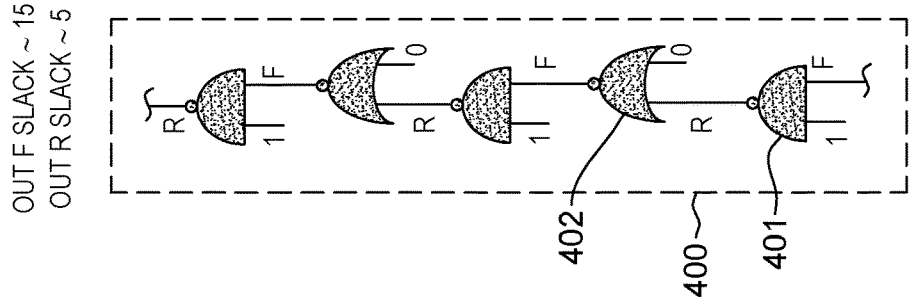

PROVIDE A COMPUTER TOOL TO FACILITATE ENHANCING DESIGN OF AN ELECTRONIC CIRCUIT TO MEET A DESIGN CRITERIA, THE COMPUTER TOOL FACILITATING: ~700

OBTAINING ONE OR MORE HYBRID LOGICAL ENTITIES, A HYBRID LOGICAL ENTITY OF THE ONE OR MORE HYBRID LOGICAL ENTITIES COMPRISING A PULL-UP CIRCUIT AND A PULL-DOWN CIRCUIT FORMED OF TRANSISTORS WITH DIFFERENT TRANSISTOR TYPES FOR PULL-UP VERSUS PULL-DOWN, AND DIFFERENT VOLTAGE THRESHOLDS FOR PULL-UP VERSUS PULL-DOWN ~702

INCORPORATING THE HYBRID LOGICAL ENTITY OF THE ONE OR MORE HYBRID LOGICAL ENTITIES INTO THE ELECTRONIC CIRCUIT DESIGN TO ENHANCE DESIGN OF THE ELECTRONIC CIRCUIT THROUGH REVISION OF THE DESIGN OF THE ELECTRONIC CIRCUIT TO PRODUCE A REVISED ELECTRONIC CIRCUIT DESIGN ~704

INITIATE MANUFACTURE OF THE ELECTRONIC CIRCUIT PURSUANT, AT LEAST IN PART, TO THE REVISED ELECTRONIC CIRCUIT DESIGN ~706

WHERE INCORPORATING THE HYBRID LOGICAL ENTITY OF THE ONE OR MORE HYBRID LOGICAL ENTITIES IN THE ELECTRONIC CIRCUIT DESIGN IS TO MEET ONE OR MORE PRESPECIFIED TRANSISTOR TYPE AND VOLTAGE THRESHOLD PAIRING LIMITS FOR THE ELECTRONIC CIRCUIT ~708

FURTHER INCLUDING IDENTIFYING A PATH OF LOGICAL ENTITIES IN THE ELECTRONIC CIRCUIT DESIGN WITH MISMATCHED RISING AND FALLING SLACKS, WHERE THE INCORPORATING INCLUDES SELECTIVELY REPLACING A UNIFORM VOLTAGE THRESHOLD LOGICAL ENTITY OF THE PATH OF LOGICAL ENTITIES WITH THE HYBRID LOGICAL ENTITY TO UTILIZE, AT LEAST IN PART, THE MISMATCHED RISING AND FALLING SLACK ~710

WHERE THE INCORPORATING INCLUDES CHANGING SLACK IN A PATH OF LOGICAL ENTITIES BY ONE OF SWAPPING-UP OR SWAPPING-DOWN A UNIFORM VOLTAGE THRESHOLD LOGICAL ENTITY BY INCORPORATING THE HYBRID LOGICAL ENTITY IN PLACE OF THE UNIFORM VOLTAGE THRESHOLD LOGICAL ENTITY IN THE PATH OF LOGICAL ENTITIES TO CREATE A REVISED PATH OF LOGICAL ENTITIES, AND WHERE THE SWAPPING-DOWN REDUCES SLACK WITHIN THE REVISED PATH OF LOGICAL ENTITIES AND THE SWAPPING-UP SAVES ENERGY DURING OPERATION OF THE REVISED SEQUENCE OF LOGICAL ENTITIES ~712

FIG. 7A

FURTHER INCLUDING UTILIZING THE CHANGED SLACK IN THE REVISED PATH OF LOGICAL ENTITIES BY THE OTHER OF SWAPPING-UP OR SWAPPING-DOWN ANOTHER LOGICAL ENTITY IN THE REVISED PATH OF LOGICAL ENTITIES BY INCORPORATING ANOTHER HYBRID LOGICAL ENTITY OF THE ONE OR MORE HYBRID LOGICAL ENTITIES IN PLACE OF THE OTHER LOGICAL ENTITY ~714

WHERE THE HYBRID LOGICAL ENTITY AND THE OTHER HYBRID LOGICAL ENTITY HAVE DIFFERENT VOLTAGE THRESHOLDS FOR AT LEAST ONE OF THEIR PULL-UP CIRCUITS OR THEIR PULL-DOWN CIRCUITS ~716

WHERE THE PULL-UP CIRCUIT INCLUDES A PAIR OF PARALLEL TRANSISTORS AND THE PULL-DOWN CIRCUIT INCLUDES A PAIR OF STACKED TRANSISTORS, THE PAIR OF PARALLEL TRANSISTORS INCLUDING A PAIR OF P-TYPE FIELD EFFECT TRANSISTORS, AND THE PAIR OF STACKED TRANSISTORS INCLUDING A PAIR OF N-TYPE FIELD EFFECT TRANSISTORS ~718

WHERE THE PAIR OF STACKED TRANSISTORS HAVE A LOWER VOLTAGE THRESHOLD THAN A VOLTAGE THRESHOLD OF THE PAIR OF PARALLEL TRANSISTORS ~720

WHERE THE PAIR OF STACKED TRANSISTORS HAVE A LARGER LEAKAGE DUTY CYCLE THAN A LEAKAGE DUTY CYCLE OF THE PAIR OF PARALLEL TRANSISTORS, AND THE PAIR OF STACKED TRANSISTORS HAVE A HIGHER VOLTAGE THRESHOLD THAN A VOLTAGE THRESHOLD OF THE PAIR OF PARALLEL TRANSISTORS ~722

FIG. 7B

ELECTRONIC CIRCUITS INCLUDING HYBRID VOLTAGE THRESHOLD LOGICAL ENTITIES

BACKGROUND

One or more aspects relate, in general, to facilitating design and manufacture of electronic circuits with enhanced performance.

Advancing semiconductor manufacturing technology allows providing more and more functionality, and thus, transistors on a single semiconductor chip. By increasing the complexity within a chip design, dependencies between different functional points, size and placement of individual devices, as well as physical/geometrical paths between logically dependent functions also increase. Additionally, the operational speed is ever-increasing, using higher and higher clock rates. Timing issues can arise when using synthesis tools for selected functions based on existing design constraints, which can result in sub-optimal circuit performance.

SUMMARY

Certain shortcomings of the prior art are overcome and additional advantages are provided through the provision, in one or more aspects, of a computer-implemented method for facilitating design and manufacture of an electronic circuit. The computer-implemented method includes providing a computer tool to facilitate enhancing the design of the electronic circuit to meet a design criteria. The computer tool facilitates obtaining one or more hybrid logical entities, where a hybrid logical entity of the one or more hybrid logical entities includes a pull-up circuit and a pull-down circuit formed of transistors with different transistor types for pull-up versus pull-down, and different voltage thresholds for pull-up versus pull-down. The computer tool further facilitates incorporating the hybrid logical entity of the one or more hybrid logical entities into the electronic circuit design to enhance design of the electronic circuit through revision of the design of the electronic circuit to produce a revised electronic circuit design. The method further includes initiating manufacture of the electronic circuit pursuant, at least in part, to the revised electronic circuit design.

Systems and computer program products relating to one or more aspects are also described and claimed herein. Further, services relating to one or more aspects are also described and can be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 4A-4D depict another example of a path of logical entities of an electronic circuit, and show operation of another embodiment of a workflow illustrating certain aspects of the one or more embodiments of the present invention;

FIGS. 7A-7B depict one example of facilitating design and manufacture of an electronic circuit, in accordance with one or more aspects of the present invention;

DETAILED DESCRIPTION

Figure 1:
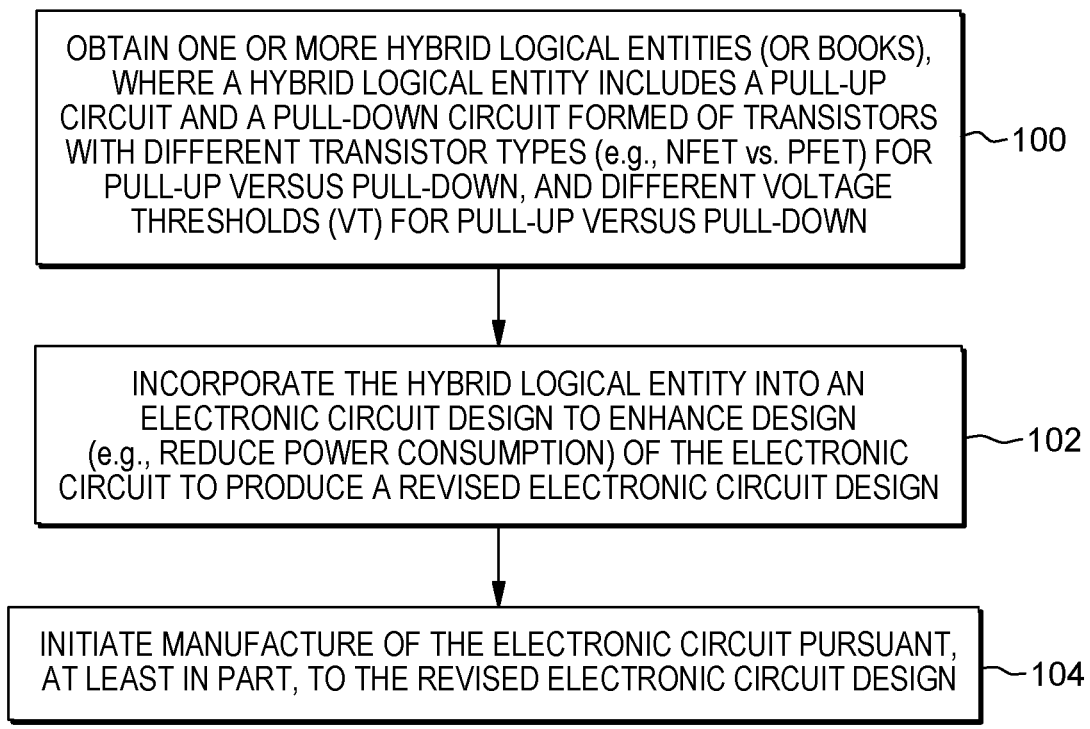
FIG. 1 depicts one embodiment of a workflow illustrating certain aspects of one or more embodiments of the present invention.

The accompanying figures, in which like reference numerals refer to identical or functionally similar elements throughout the separate views, and which are incorporated in and form a part of the specification, further illustrate the present invention and, together with the detailed description, serve to explain aspects of the present invention. Note in this regard that descriptions of well-known systems, devices, design tools, and manufacturing and processing techniques, etc., are omitted so as not to obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that, numerous inventive aspects and features are disclosed herein, and unless inconsistent, each disclosed aspect or feature is combinable with any other disclosed aspect or feature as desired for a particular application of one or more of the concepts disclosed herein.

Note also that illustrative embodiments are described below using specific systems, circuits, designs, architectures, protocols, layouts, schematics, or tools only as examples, and not by way of limitation. Furthermore, the illustrative embodiments are described in certain instances using particular software, hardware, firmware, tools, or data processing environments only as example for clarity of description. The illustrative embodiments can be used in conjunction with other comparable or similarly purposed systems, applications, or architectures. One or more aspects of an illustrative embodiment can be implemented in hardware, software, or a combination thereof.

As understood, circuit design is the process of working out the physical form that an electronic circuit will take, the result of the circuit design process is instructions on how to construct the physical electronic circuit. One or more computer tools typically assist in the electronic circuit design process. In one embodiment, the steps for designing and manufacturing an electronic circuit, such as an integrated circuit or integrated circuit chip, an application-specific integrated circuit (ASIC), a system area chip (SoC), etc., include, for instance, system specification, architectural design, functional design and logic design, circuit design, physical design, physical verification and sign-off, layout post-processing, fabrication of the circuit, and packaging and testing of the circuit. During the circuit design stage, and electronic circuit design is obtained, which is then used, at least in part, in the physical design and manufacture of the electronic circuit.

One or more aspects of the computer-implemented methods, systems and computer program products described herein improve tool support for design and manufacture of electronic circuits, such as one or more "power-down" tools used during the design process to enhance electronic circuit performance by, for instance, saving energy by reducing power consumption of the electronic circuit. In one or more implementations, disclosed herein are hybrid logical entities, or hybrid voltage threshold (VT) logical entities, books or devices, which facilitate reaching a better electronic circuit design point with improved power efficiency, while mitigating the effect of any skewed leakage profiles in paths or sequences of logical entities in the electronic circuit.

With current foundry technology, design tools have little freedom in per-device voltage threshold (VT) selection, and hence have to accept how the devices are voltage-centered, which can lead to devices in a path of logical entities with skewed leakage profiles, resulting in sub-optimal circuit performance. In particular, logical entities with common or uniform voltage thresholds are typically used across logical entity or device types, which inherently prevents different voltage threshold selection for different transistor types in a logical entity, book, device, etc., such as for different n-type, metal-oxide-semiconductor (NMOS) and p-type, metal-oxide-semiconductor (PMOS) devices in a logical entity.

In certain embodiments, disclosed herein are logical entities, referred to as hybrid logical entities, or hybrid voltage threshold (VT) logical entities, that enable more independent control of, for instance, pull-up and pull-down circuit pairings, with specific topologies being disclosed to exploit slack in either a rising transition or a falling transition of a path or sequence of logical entities in an electronic circuit design. Further, voltage threshold percentages can be limited by prespecifying different voltage threshold and device (or transistor) pairing units. In addition, workflows are disclosed to facilitate creating slack in a path of logical entities, and thereby provide the opportunity for enhanced logical entity-pair utilization within the logical entity path.

FIG. 1 depicts one embodiment of a workflow, in accordance with one or more aspects of the present invention. As illustrated, in one embodiment, a computer-implemented, electronic circuit design tool is provided (or enhanced) as disclosed herein to facilitate design and manufacture of an electronic circuit to meet a design criteria, such as a reduced power consumption criteria, and/or maintaining specified transistor type and voltage threshold limits. The design tool process includes, in one or more embodiments, obtaining one or more hybrid logical entities, where a hybrid logical entity of the one or more hybrid logical entities includes a pull-up circuit and a pull-down circuit formed of transistors with different transistor types for pull-up versus pull-down, and different voltage thresholds for pull-up versus pull-down 100. Further, the design tool incorporates the hybrid logical entity of the one or more hybrid logical entities into the electronic circuit design to enhance design of the electronic circuit through revision of the design of the electronic circuit to produce a revised electronic circuit design 102. Manufacture of the electronic circuit is then initiated pursuant, at least in part, to the revised design of the electronic circuit 104.

Figure 8:
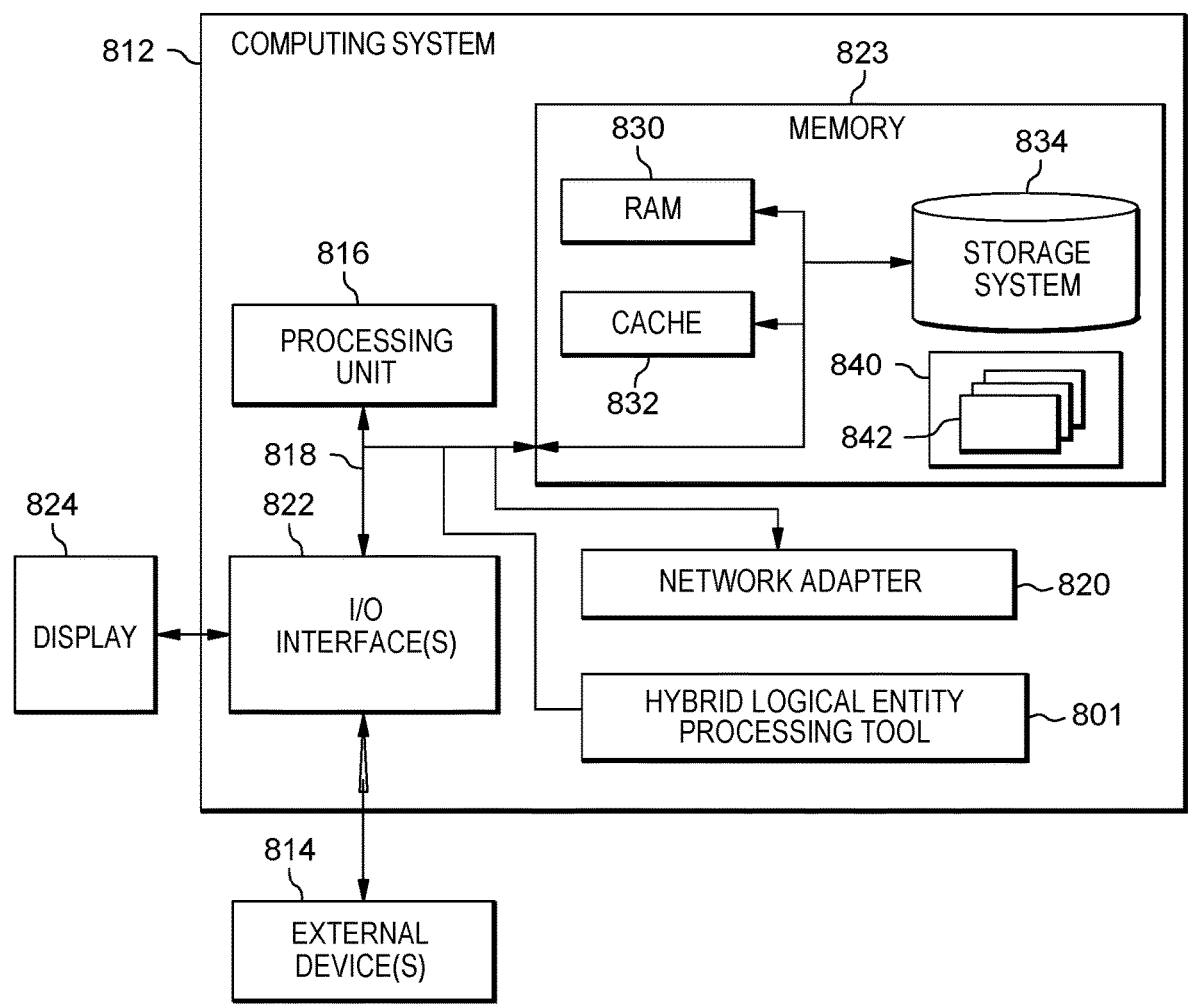
FIG. 8 depicts one embodiment of a computing system to implement, or facilitate implementing, one or more aspects of hybrid logical entity tool processing, in accordance with one or more aspects of the present invention.

In certain embodiments, one or more aspects of the hybrid logical entity processing disclosed are implemented via program code. Program code, as referred to in this application, includes software and/or hardware. For example, program code in certain embodiments of the present invention can include a software-based implementation of the functionality described. Certain embodiments can also combine both hardware and software, for instance, as firmware. One example of program code, also referred to as one or more programs, is depicted in FIG. 8 as program/utility 840, having a set (at least one) of program modules 842, which can be stored in memory 823 and/or as a hybrid logical entity processing tool or module 801 of a computing system 812.

Figure 2A:
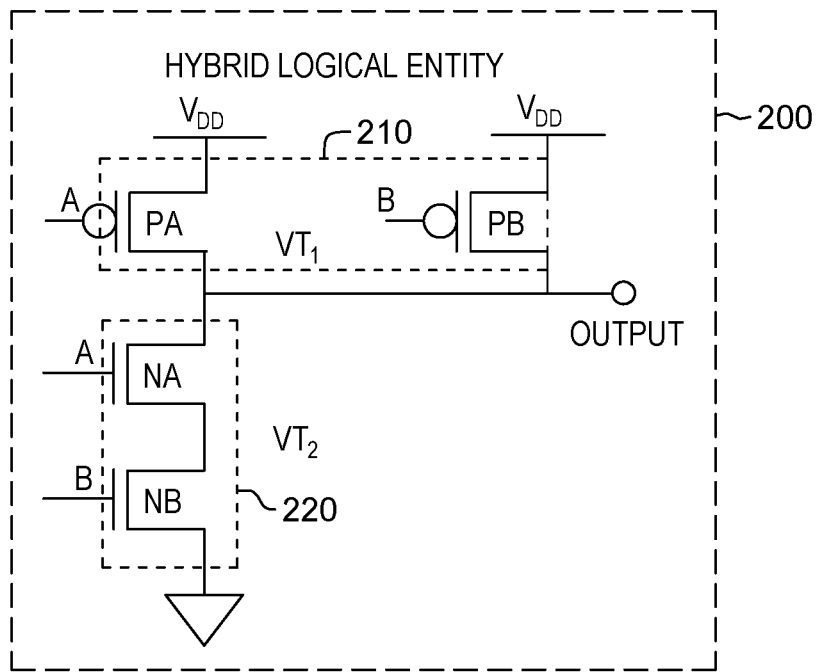
FIG. 2A depicts one embodiment of a hybrid logical entity with different transistor types and different voltage thresholds, in accordance with one or more aspects of the present invention.
Figure 2B:
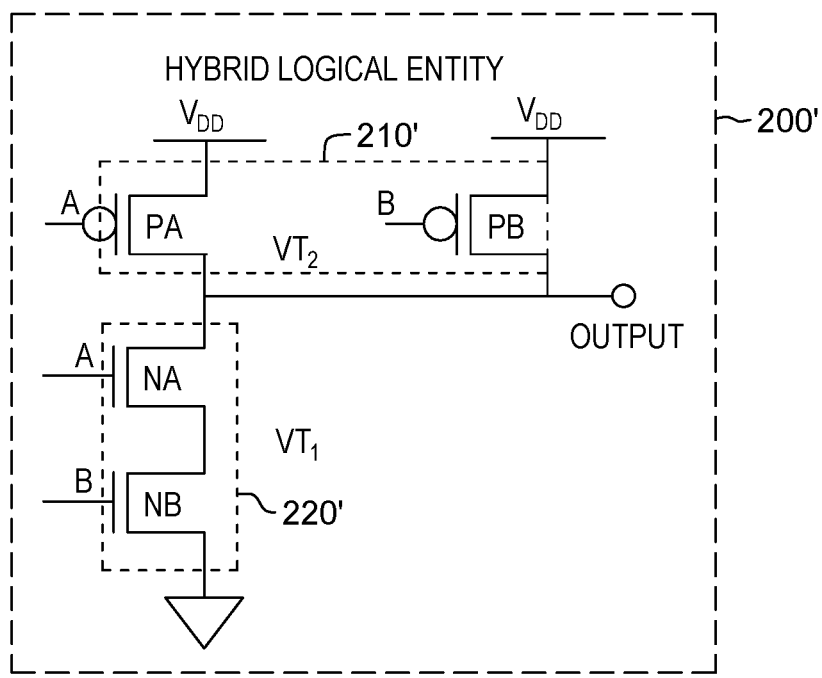
FIG. 2B depicts another embodiment of a hybrid logical entity with different transistor types and different voltage thresholds, in accordance with one or more aspects of the present invention.

FIGS. 2A & 2B depict different embodiments of a hybrid logical entity, or hybrid voltage threshold (VT) logical entity, in accordance with one or more aspects of the present invention.

Referring to FIG. 2A, one embodiment of a hybrid logical entity 200, or hybrid or combinatorial book or device, is illustrated. As shown, hybrid logical entity 200 includes, in one embodiment, a pull-up circuit 210 and a pull-down circuit 220, with pull-up circuit 210 being electrically connected between positive supply voltage $V_{DD}$ and the logic gate output 205. A variety of logic combinations can be used, with pull-up circuit 210 being depicted as a pair of parallel transistors, and in particular, a pair of p-type field effect transistors PA, PB. In addition, in the embodiment depicted, pull-down circuit 220 is electrically connected between logic gate output 205 and a negative power supply voltage, such as ground. As shown, in one implementation, pull-down circuit 220 includes a pair of stacked transistors, such as a pair of stacked n-type field effect transistors NA, NB. In one embodiment, the hybrid logical entity is an example of a NAND device.

In one or more implementations, the voltage threshold (VT) is selected to be different between the pull-up and pull-down circuits. For instance, in one embodiment, pull-up circuit 210 includes transistors with a voltage threshold $VT_1$, and pull-down circuit 220 is implemented with transistors with a voltage threshold $VT_2$, where $VT_2$ is a lower voltage threshold than $VT_1$. In other implementations, hybrid logical books can be created with other voltage thresholds for the pull-up versus pull-down circuits including, for instance, using voltage threshold $VT_2$ PFETs ($VT_{2P}$) for the pull-up circuit, and voltage threshold $VT_1$ NFETs ($VT_{1N}$) for the pull-down circuit, or voltage threshold $VT_3$ PFETs ($VT_{3P}$) for the pull-up circuit and voltage thresholds $VT_2$ NFETs ($VT_{2N}$) for the pull-down circuit, where $VT_3$ is a lower voltage threshold than $VT_2$. In one or more implementations, a wide variety of hybrid logical entities such as described herein can be created for use in design of electronic circuits. In accordance with one or more aspects of the present invention, voltage threshold design management is enhanced by allowing restriction of voltage threshold limits in a path or sequence of logical entities using both voltage threshold differences and device pairing differences.

FIG. 2B depicts another embodiment of a hybrid logical entity 200', in accordance with one or more aspects of the present invention. Hybrid logical entity 200' is similar in design to hybrid logical entity 200 of FIG. 2A described above. As illustrated, hybrid logical entity 200' includes a pull-up circuit 210' including a pair of parallel transistors, and a pull-down circuit 220' formed by a pair of stacked transistors, with the pair of parallel transistors 210' being a pair of parallel p-type field effect transistors, PA, PB, and the pair of stacked transistors 220' being a pair of n-type field effect transistors, NA, NB. In the depicted embodiment, the parallel transistors of the pull-up circuit 210' have voltage thresholds $VT_2$, and the transistors of the pull-down circuit 220' are implemented with voltage threshold $VT_1$ transistors.

In one embodiment, faster (or leakier) voltage threshold transistors can be used for transistors of the pull-down circuit, while slower (or less-leaky) transistors can be used for transistors of the pull-up circuit to mitigate performance issues, as illustrated in the hybrid logical entity embodiment of FIG. 2A. In another approach, less-leaky voltage thresholds can be used for transistors in the pull-down circuit, which have a larger leakage duty cycle than the transistors in the pull-up circuit, as in the embodiment of FIG. 2B. Many variations are possible using hybrid logical entity designs such as described herein.

As a further example, an electronic circuit design tool can restrict voltage thresholds by leakage width and by voltage threshold types. For instance, a conventional design can be allowed to use 0% $VT_3$, 20% $VT_2$, 100% $VT_1$, in terms of leakage width percentages in a sequence of logical entities. However, in one example, a design with 15% $VT_2$ NFET, plus 5% $VT_2$ PFET, may be considerably worse than a design with 5% $VT_2$ NFET plus 15% $VT_2$ PFET. Advantageously, disclosed herein is the use of voltage threshold plus transistor type-based restrictions in creating hybrid logical entities for an electronic circuit. In particular, different NFET and PFET leakage width limits can be defined, such as 0% $VT_3$ NFET, 5% $VT_2$ NFET, and 100% $VT_1$ NFET, along with 0% $VT_3$ PFET, 15% $VT_2$ PFET, and 100% $VT_1$ PFET. In one such example, enabling a smaller limit for $VT_2$ NFET as compared to $VT_2$ PFET can result in reduced power consumption, when $VT_2$ NFET is leakier compared to $VT_2$ PFET. In another example, enabling a higher limit for $VT_2$ PFET as compared to $VT_2$ NFET can result in improved circuit performance, when $VT_2$ PFET is faster than $VT_2$ NFET.

FIGS. 3A-3D depict one example of a path or sequence of logical entities 300 of an electronic circuit design to be revised, in accordance with one or more aspects of the present invention. As illustrated, the path of logical entities in FIG. 3A includes a series of electrically-coupled NAND gates 301 and NOR gates 302, where a rising R signal input to a first NAND gate 301 in the path is propagated to a falling F signal at the output of the last NAND gate in the path. As illustrated, the output falling transition slack is 5 picoseconds, and the rising transition slack is 15 picoseconds, in one embodiment. As indicated by the legend for FIGS. 3A-3D, in addition to logical entities or devices with a common or uniform voltage threshold, which is voltage threshold $VT_2$ in this example, hybrid logical entities are also provided which include logical entities with voltage threshold $VT_2$ n-type transistors ($VT_{2N}$) and low-voltage threshold $VT_{1P}$-type ($VT_{1P}$) transistors for the pull-down and pull-up circuits, as well as a hybrid logical entity with voltage threshold $VT_2$ n-type ($VT_{2N}$) transistors and voltage threshold $VT_3$ p-type ($VT_{3P}$) transistors, in one embodiment for the pull-down and pull-up circuits.

Figure 3D:
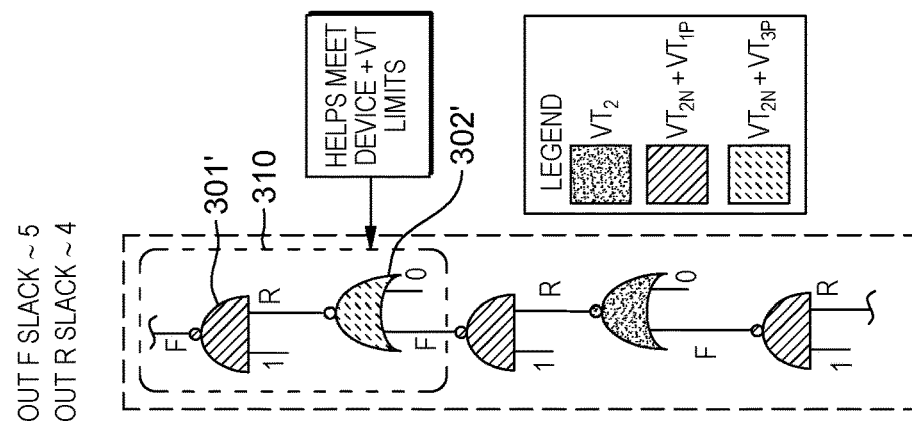
FIGS. 3A-3D depict one embodiment of a path of logical entities of an electronic circuit, and show operation of one embodiment of a workflow illustrating certain aspects of one or more embodiments of the present invention.
Figure 3C:
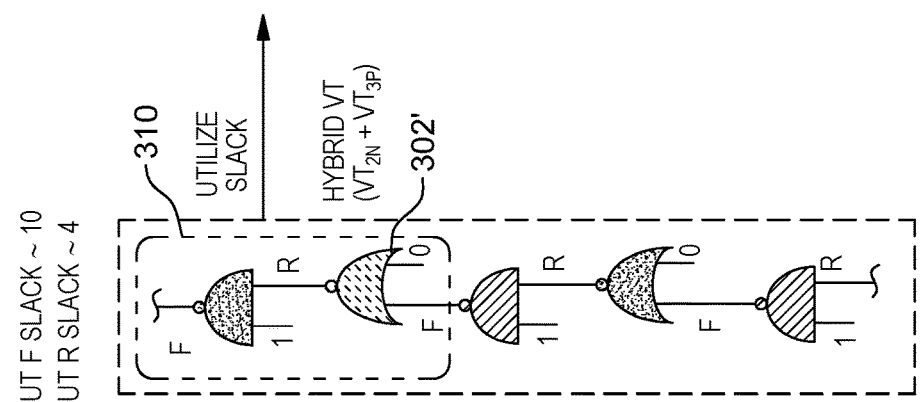
Figure 3B:
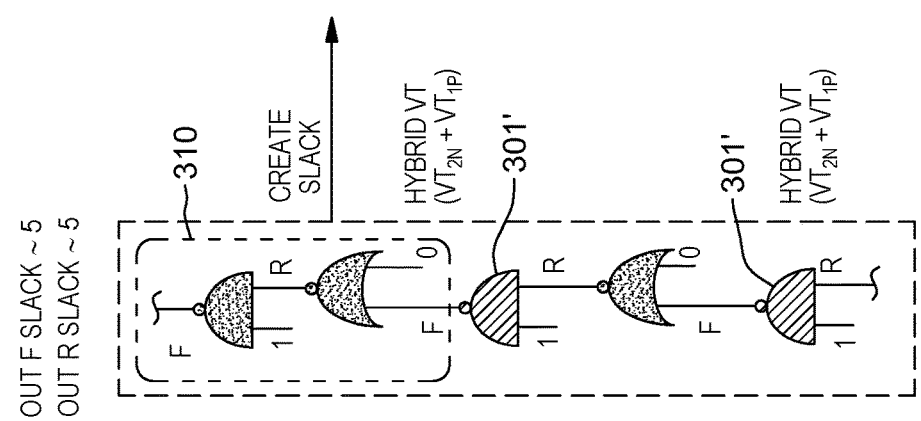
Figure 3A:
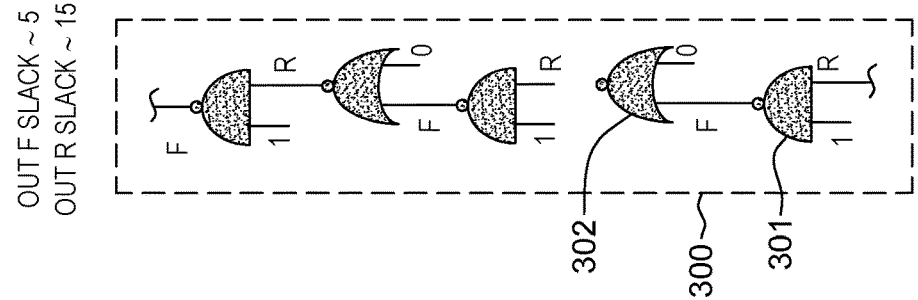

In one or more implementations, the path of logical entities 300 has mismatched rising and falling transition slacks as illustrated in FIG. 3A, and as a result, one or more of the logical entities are selected for replacement with a hybrid logical entity, such as described herein. In one implementation, the logical entities with the maximum return on investment are selected for replacement with a hybrid voltage threshold logical entity, such as the hybrid logical entity with voltage threshold $VT_2$ n-type ($VT_{2N}$) transistors and voltage threshold $VT_1$ p-type ($VT_{1P}$) transistors, as illustrated in FIG. 3B. The result is that the output falling transition slack is approximately 5 picoseconds, as well as the output rising transition slack. If no further replacements or swaps are possible, then the processing disclosed herein can find paths or portions of paths with voltage threshold $VT_2$ logical entities that can still undergo further replacement as described below. For instance, as illustrated in FIG. 3C, in one embodiment, a pair of logical entities 310 in the path is selected for evaluation together, as a pair, with slack being created by selectively swapping-up one of the uniform VT logical entities to a hybrid voltage threshold logical entity such as disclosed herein. In the example of FIGS. 3A-3D, a swap-up refers to changing, for instance, a voltage threshold ($VT_2$) gate 302 to a voltage threshold ($VT_2$) and voltage threshold ($VT_3$) gate, such as the illustrated $VT_2N$ & $VT_{3P}$ logical entity 302' of FIG. 3C.

As illustrated in FIG. 3C, the result in one example is that the falling transition slack increases to 10 picoseconds, and the rising transition slack drops to 4 picoseconds. The added slack can then be utilized to selectively swap-down another logical entity to a hybrid voltage threshold logical entity 301' on the same path, and in this case, in the same pairing 310, as illustrated in FIG. 3D. Note that as used herein, a swap-down refers to going from, for instance, a $VT_2$ gate to a $VT_2+VT_1$ gate, with the resultant falling and rising slack transitions being in one example 5 and 4 picoseconds, respectively, as illustrated. The result of the process is that the revised path of logical entities in FIG. 3D has a lower or minimum slack, and meets prespecified device and voltage threshold limits for the use of different transistor types.

FIGS. 4A-4D depict another example of a path or sequence of logical entities 400 of an electronic circuit design to be revised, in accordance with one or more aspects of the present invention. As illustrated, the path of logical entities of FIG. 4A includes a series of electrically-coupled NAND gates 401 and NOR gates 402, where a falling F signal input to a first NAND gate 401 in the path is propagated to a rising R signal at the output of the last NAND gate in the path. The output falling transition slack is 15 picoseconds, and the rising transition slack is 5 picoseconds, as one example. As indicated by the legend for FIGS. 4A-4D, in addition to logical entities or devices with a common or uniform voltage threshold, which is a super-low-voltage threshold (SLVT) in this embodiment, hybrid logical entities are also provided which include logical entities with a low-voltage threshold $VT_1$ n-type ($VT_{1N}$) transistors and voltage threshold $VT_2$ p-type ($VT_{2P}$) transistors for the pull-down and pull-up circuits, as well as a hybrid logical entity with voltage threshold $VT_2$ n-type ($VT_{2N}$) transistors and voltage threshold $VT_3$ p-type ($VT_{3P}$) transistors for the pull-down and pull-up circuits, in one embodiment.

In one or more implementations, the path of logical entities 400 has mismatched falling and rising transition slacks, as illustrated in FIG. 4A, and as a result, one or more of the logical entities are selected for replacement with a hybrid logical entity, such as described herein. In one implementation, the logical entities with a maximum return on investment are selected for replacement with a hybrid voltage threshold logical entity, such as the hybrid logical entity with voltage threshold $VT_1$ n-type ($VT_{1N}$) transistors and voltage threshold $VT_2$ p-type ($VT_{2P}$) transistors, as illustrated in FIG. 4B. The result is that the output falling transition slack is approximately 5 picoseconds, as well as the output rising transition slack. If no further replacements or swaps are possible, meaning that the rising and falling transition slacks are at a minimum, or close to zero, then the processing can find a path or portions of a path with voltage threshold $VT_2$ logical entities that can still undergo further replacement, as described herein. For instance, as illustrated in FIG. 4C, in one embodiment, a pair of logical entities 410 in the path is selected for evaluation together, as a pair, with slack being created by selectively swapping-up one of the uniform VT logical entities to a hybrid voltage threshold logical entity 402', such as disclosed herein. In the example of FIGS. 4A-4D, a swap-up refers to changing, for instance, a voltage threshold ($VT_2$) gate to a voltage threshold ($VT_2$) and voltage threshold ($VT_3$) gate, as illustrated in $VT_{2N}$+ $VT_{3P}$ logical entity 402' of FIG. 4C.

As illustrated in FIG. 4C, the result is that the falling transition slack increases to 10 picoseconds, and the rising transition slack drops to 4 picoseconds. The added slack can then be utilized to selectively swap-down another logical entity to a hybrid voltage threshold logical entity on the same path, and in the same pairing 410 in this case, as illustrated in FIG. 4D. Note that as used herein, a swap-down refers to going from, for instance, a $VT_2$ gate to a $VT_1$+$VT_2$ gate, with the resultant falling and rising transition slacks being 5 and 4 picoseconds, respectively, as illustrated. The result of the process is the revised path of logical entities in FIG. 4D has a lower or minimum slack, and meets pre-specified device and voltage threshold design limits for use of different transistor types.

Figure 5:
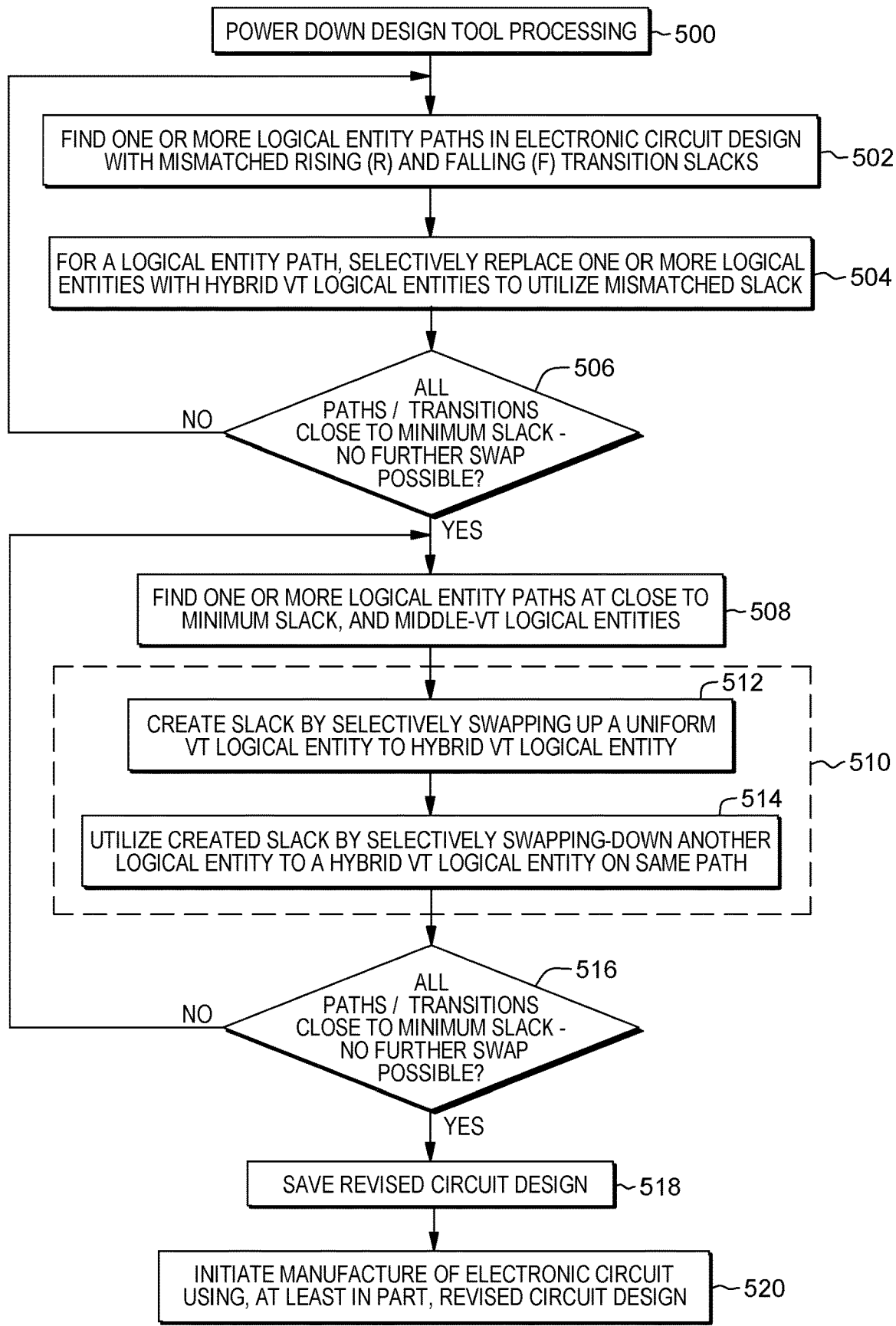
FIG. 5 depicts a more detailed embodiment of a workflow illustrating certain aspects of one or more embodiments of the present invention.

FIG. 5 depicts one embodiment of a workflow illustrating certain aspects of one or more embodiments of the present invention. In one implementation, the processing depicted is part of, or an add-on to, power-down design tool processing 500, with the input being an electronic circuit design with one or more paths or sequences of logical entities that have a common or uniform voltage threshold. The power-down tool finds one or more logical entity paths in the electronic circuit design with mismatched rising (R) and falling (F) transition slack 502. In accordance with one or more aspects of the present invention, power consumption of the electronic circuit being manufactured is reduced by utilizing extra slack in the one or more paths of logical entities identified with mismatched rising and falling transition slacks. In particular, for a logical entity path, one or more logical entities in the path are selectively replaced with a hybrid VT logical entity to utilize the mismatched slack 504, which results in reducing the mismatch between the rising and falling transition slacks. Processing determines whether all paths and/or transitions are close to a minimum slack, such that no further swapping-in of a hybrid VT logical entity is possible 506.

Once all paths and/or transitions are close to minimum slack, then processing finds one or more logical entity paths or sequences at close to minimum slack, and with $VT_2$ logical entities, that is, with uniform VT logical entities 508. For a logical entity path identified, processing evaluates two $VT_2$ logical entities as a pair 510 and creates slack by selectively swapping-up a uniform VT logical entity to a hybrid VT logical entity 512. Processing then utilizes the created slack by selectively swapping down another logical entity of the pair of logical entities on the same path to a hybrid VT logical entity 514, and then determines whether all paths and/or transitions are close to minimum slack, or that no further swap for the path of logical entities is possible 516. Once no further swap is possible, the revised circuit design is saved 518, and manufacture of the electronic circuit is initiated using, at least in part, the revised circuit design 520.

Figure 6:
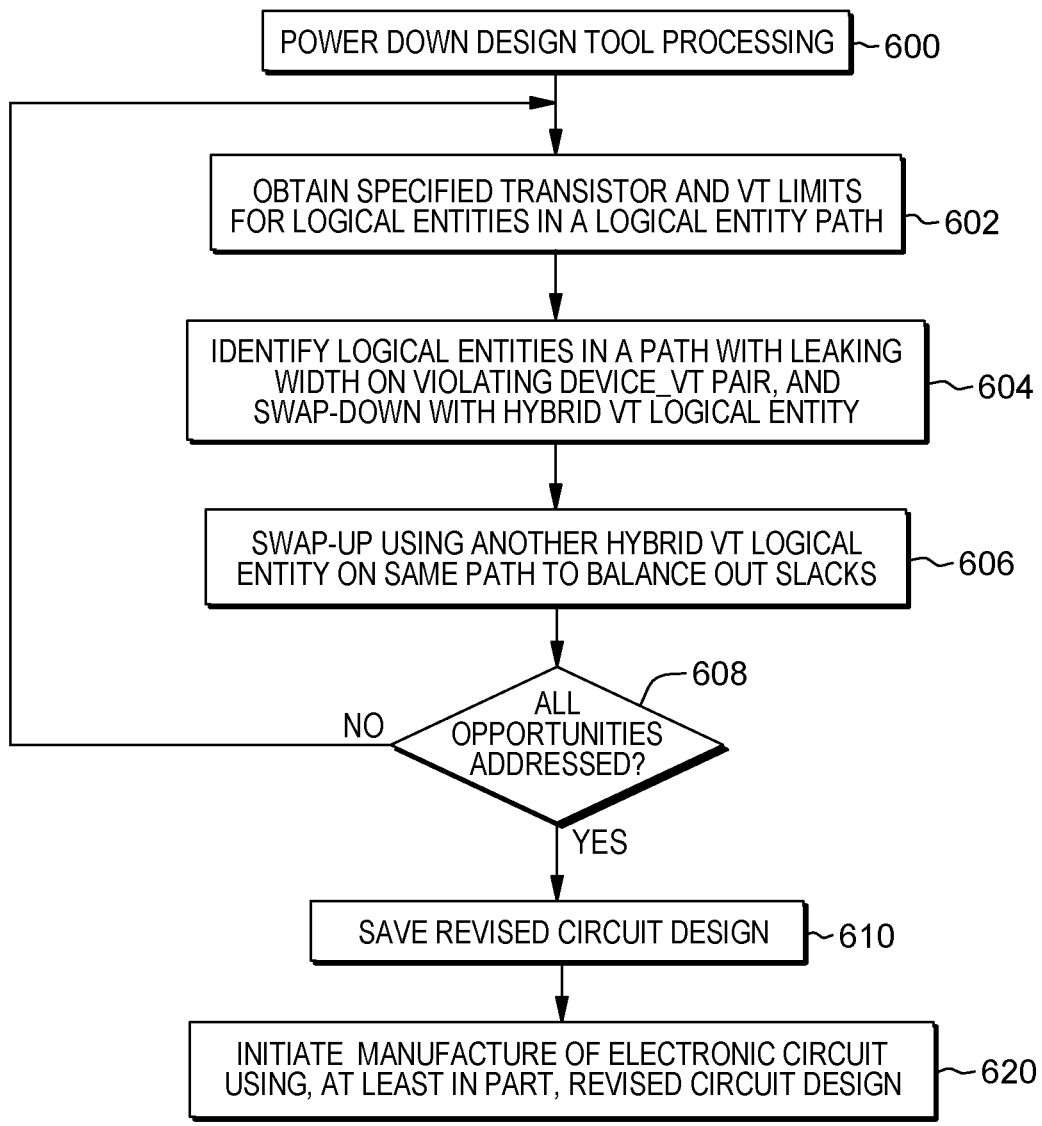
FIG. 6 illustrates a further embodiment of a workflow illustrating certain aspects of one or more embodiments of the present invention.

FIG. 6 illustrates a further embodiment of a workflow depicting certain aspects of one or more embodiments of the present invention. This figure depicts one embodiment for voltage threshold limit management, such as disclosed herein. As depicted, power-down design tool processing 600 is performed producing, in one embodiment, an electronic circuit design with one or more paths or sequences of logical entities having a uniform voltage threshold. Processing obtains specified transistor and VT limits for logical entities in a logical entity path for the electronic circuit design 602, and identifies any logical entities in a path with leaking width on violating device_VT pair specifications, and swaps-down one of the logical entities with a hybrid VT logical entity 604. For instance, the logical entity with the highest return on investment can be identified and swapped-down with the hybrid VT logical entity. In one example, return on investment can be defined as the ratio of the width of the offending device-VT pair in the logic entity to the change in slack, if that logical entity is replaced by a hybrid VT logical entity. Processing then swaps-up another logical entity on the same path of logical entities with another hybrid VT logical entity, to balance out the slacks 606, and determines whether all opportunities have been addressed 608. Assuming that all opportunities have been addressed, the revised circuit design is saved 610, and manufacture of the electronic circuit is subsequently initiated using, at least in part, the revised circuit design 620. In accordance with this processing, hybrid VT logical entities are introduced into the path of logical entities in order to bring the sequence of logical entities into the desired, specified device+VT limits for the electronic circuit. For instance, where a path of logical entities has more PFETs than allowed, then one or more of the PFETs are replaced by PFETs of a lower voltage threshold to get the logical entity circuit design within specified limits. Note that the result of swapping-down is, in one or more implementations, making the path of logical entities slightly slower, while the result of swapping-up is to make the path of logical entities faster.

Further details of one embodiment of facilitating design and manufacture of an electronic circuit, as it relates to one or more aspects of the present invention, are described below with reference to FIGS. 7A-7B.

Referring to FIG. 7A, in one embodiment, a computer tool is provided to facilitate enhancing design of an electronic circuit to meet a design criteria 700. The computer tool facilitates obtaining one or more hybrid logical entities, where a hybrid logical entity of the one or more hybrid logical entities includes a pull-up circuit and a pull-down circuit formed of transistors with different transistor types for pull-up versus pull-down, and different voltage thresholds for pull-up versus pull-down 702. Further, the computer tool facilitates incorporating the hybrid logical entity of the one or more hybrid logical entities into the electronic circuit design to enhance design of the electronic circuit through revision of the design of the electronic circuit to produce a revised electronic circuit design 704. Manufacture of the electronic circuit is initiated pursuant, at least in part, to the revised electronic circuit design 706.

In one or more embodiments, incorporating the hybrid logical entity of the one or more hybrid logical entities in the electronic circuit design is to meet one or more prespecified transistor type and voltage threshold pairing limits for the electronic circuit 708.

In one or more embodiments, the method includes identifying a path of logical entities in the electronic circuit design with mismatched rising and falling slacks, where the incorporating includes selectively replacing a uniform voltage threshold logical entity of the logical path of logical entities with a hybrid logical entity to reduce, at least in part, the mismatched rising and falling slack 710. In one embodiment, the incorporating includes changing slack in a path of logical entities by one of swapping-up or swapping-down a uniform voltage threshold logical entity by incorporating the hybrid logical entity in place of the uniform voltage threshold logical entity in the path of logical entities to create a revised path of logical entities, where the swapping-down reduces slack within the revised path of logical entities, and the swapping-up saves energy during operation of the revised sequence of logical entities 712.

Referring to FIG. 7B, the process further includes utilizing the changed slack in the revised path of logical entities by the other of swapping-up or swapping down another logical entity in the revised path of logical entities by incorporating another hybrid logical entity of the one or more hybrid logical entities in place of the other logical entity 714. In one embodiment, the hybrid logical entity and the other hybrid logical entity have different voltage thresholds for at least one of the pull-up circuits or the pull-down circuits 716.

In one or more implementations, the pull-up circuit includes a pair of parallel transistors, and the pull-down circuit includes a pair of stacked transistors, where the pair of parallel transistors include a pair of p-type field effect transistors, and the pair of stacked transistors include a pair of n-type field effect transistors 718. In one embodiment, the pair of stacked transistors have a lower voltage threshold than a voltage threshold of the pair of parallel transistors 720. In a further embodiment, the pair of stacked transistors have a larger leakage duty cycle than a leakage duty cycle of the pair of parallel transistors, and the pair of stacked transistors have a higher voltage threshold than a voltage threshold of the pair of parallel transistors 722.

Further exemplary embodiments of a computing environment to implement one or more aspects of the present invention are described below with reference to FIGS. 8-10.

By way of further example, FIG. 8 depicts one embodiment of a computing environment 800, which includes a computing system 812. Examples of well-known computing systems, environments, and/or configurations that may be suitable for use with computer system 812 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 812 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 8, computing system 812, is shown in the form of a general-purpose computing device. The components of computing system 812 can include, but are not limited to, one or more processors or processing units 816, a system memory 823, and a bus 818 that couples various system components including system memory 823 to processor 816.

In one embodiment, processor 816 may be based on the z/Architecture offered by International Business Machines Corporation, or other architectures offered by International Business Machines Corporation or other companies.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 812 can include a variety of computer system readable media. Such media may be any available media that is accessible by computing system 812, and it includes both volatile and non-volatile media, removable and non-removable media.

System memory 823 can include computer system readable media in the form of volatile memory, such as random access memory (RAM) 830 and/or cache memory 832. Computing system 812 can further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 818 by one or more data media interfaces. As described below, memory 823 can include at least one program product having a set (e.g., at least one) of program modules or code that are configured to carry out the functions of embodiments of the invention.

Program/utility 840, having a set (at least one) of program modules 842, can be stored in memory 832 by way of example, and not limitation, as well as an operating system, one or more application programs, other program modules, and program data. Each of the operating system, one or more application programs, other program modules, and program data or some combination thereof, can include an implementation of a networking environment. Program modules 842 generally carry out the functions and/or methodologies of embodiments of the invention as described herein. Alternatively, a hybrid logical entity processing tool, facility, module, logic, etc., 801 can be provided within computing environment 812, as disclosed herein.

Computing system 812 can also communicate with one or more external devices 814 such as a keyboard, a pointing device, a display 824, etc.; one or more devices that enable a user to interact with computing system 812; and/or any devices (e.g., network card, modem, etc.) that enable computing system 812 to communicate with one or more other computing devices. Such communication can occur via Input/Output (I/O) interfaces 822. Still yet, computing system 812 can communicate with one or more networks such as a local area network (LAN), a general wide area network (WAN), and/or a public network (e.g., the Internet) via network adapter 820. As depicted, network adapter 820 communicates with the other components of computing system, 812, via bus 818. It should be understood that although not shown, other hardware and/or software components could be used in conjunction with computing system 812. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 8. Computer system/server 812 of FIG. 8 can be practiced in distributed cloud computing environments where tasks are performed by remote processing devices that are linked through a communications network. In a distributed cloud computing environment, program modules may be located in both local and remote computer system storage media including memory storage devices. Computer system/server 912 is capable of being implemented and/or performing any of the functionality set forth hereinabove.

Figure 9:
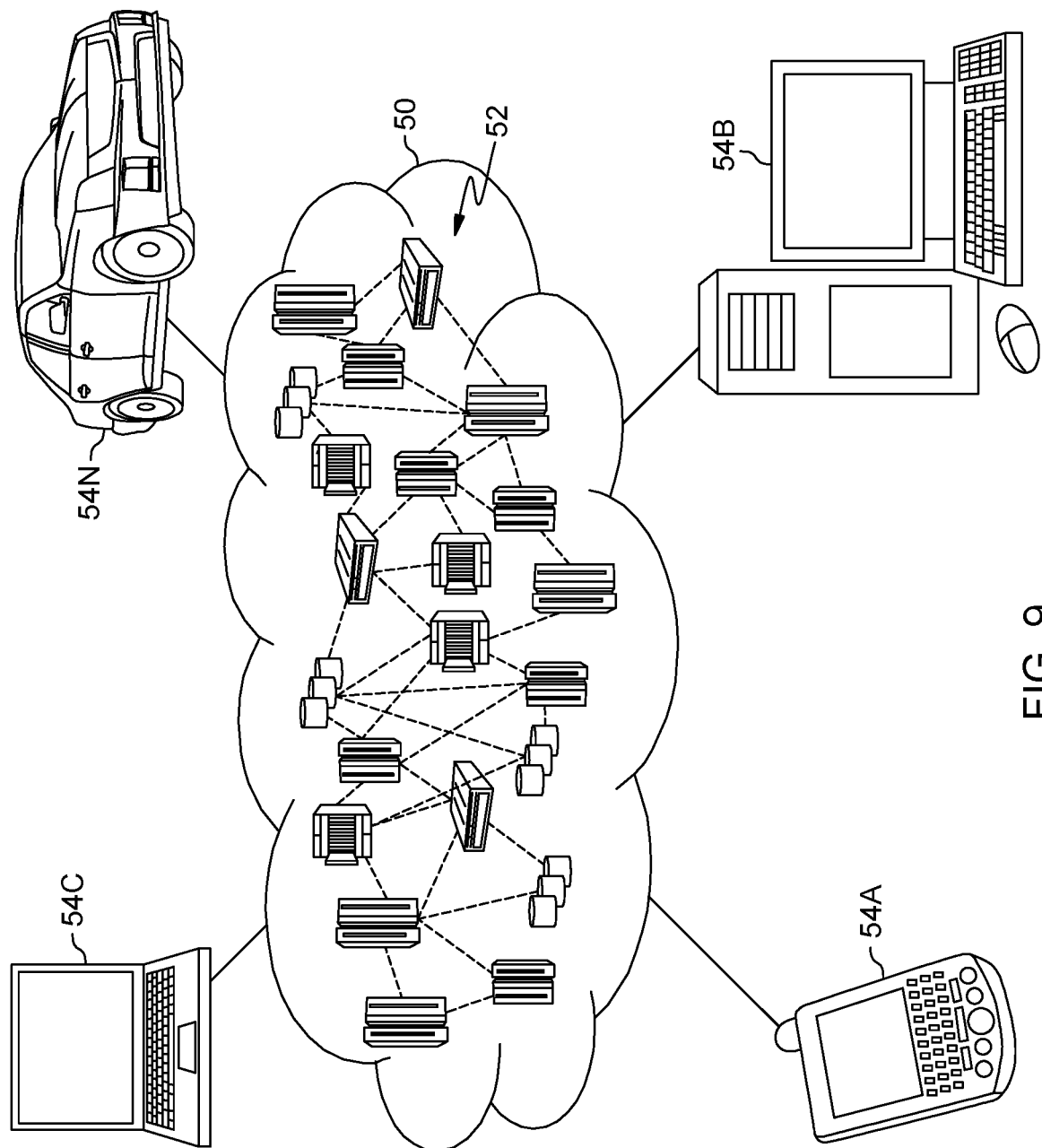
FIG. 9 depicts one embodiment of a cloud computing environment which can facilitate implementing, or be used in association with, certain aspects of an embodiment of the present invention.

Referring now to FIG. 9, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 10:
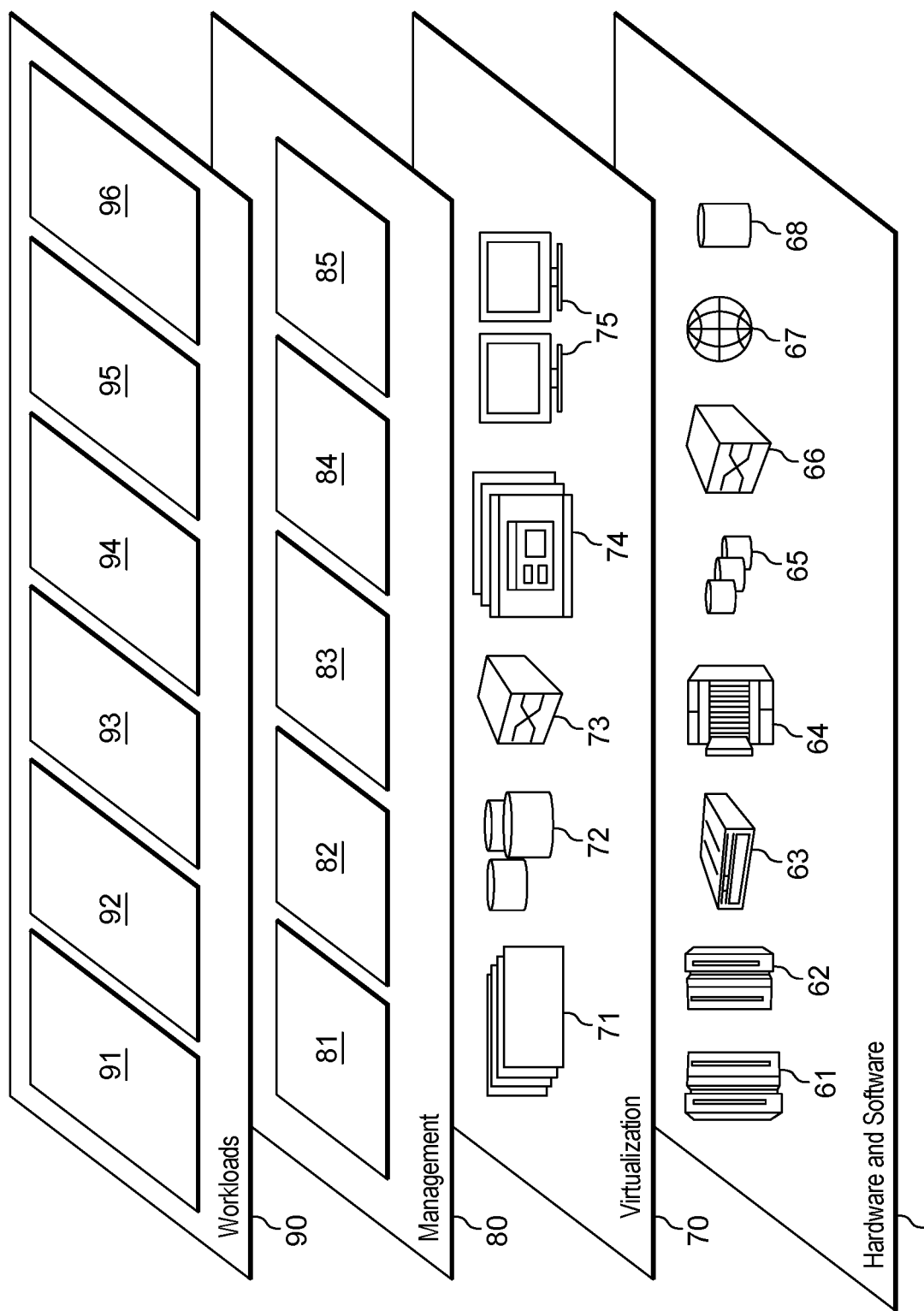
FIG. 10 depicts abstraction model layers according to an embodiment of the present invention.

Referring to FIG. 10, a set of functional abstraction layers provided by cloud computing environment 50 (FIG. 9) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hybrid logical entity tool processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method for facilitating design and manufacture of an electronic circuit, the computer-implemented method comprising:
   providing a computer tool to enhance the design of the electronic circuit to meet a design criteria, the computer tool:
      obtaining specified transistor plus voltage threshold limits for a logical entity path for an electronic circuit design;
      obtaining multiple hybrid logical entities, each hybrid logical entity of the multiple hybrid logical entities comprising a pull-up circuit and a pull-down circuit formed of transistors with different transistor types for pull-up versus pull-down, and different voltage thresholds for pull-up versus pull-down;
      incorporating a hybrid logical entity of the multiple hybrid logical entities into the electronic circuit design in place of a uniform voltage threshold logical entity in the path of logical entities of the electronic circuit design to enhance design of the electronic circuit through revision of the design of the electronic circuit to produce a revised electronic circuit design;
      wherein the incorporating changes slack in the path of logical entities by one of swapping-up or swapping-down the uniform voltage threshold logical entity via incorporating the hybrid logical entity in place of the uniform voltage threshold logical entity in the path of logical entities of the electronic circuit design to create the revised path of logical entities, and wherein the swapping-down saves energy during operation of the revised path of logical entities and the swapping-up increases slack within the revised path of logical entities;
      based on the incorporating of the hybrid logical entity in the path of logical entities of the electronic circuit design to produce the revised electronic circuit design, further incorporating another hybrid logical entity of the multiple hybrid logical entities into the revised path of logical entities in place of another uniform voltage threshold logical entity of the revised path of logical entities to generate a further revised path of logical entities, wherein the further incorporating utilizes the changed slack in the revised path of logical entities in relation to the path of logical entities, and brings the further revised path of logical entities into the obtained specified transistor plus voltage threshold limits for the electronic circuit design; and
   initiating manufacture of the electronic circuit pursuant, at least in part, to the further revised electronic circuit design.

2. The computer-implemented method of claim 1, wherein incorporating the hybrid logical entity of the multiple hybrid logical entities in the electronic circuit design is to meet one or more prespecified transistor type limits for the electronic circuit.

3. The computer-implemented method of claim 1, further comprising identifying a path of logical entities in the electronic circuit design with mismatched rising and falling slacks, and wherein the incorporating comprises selectively replacing a uniform voltage threshold logical entity of the path of logical entities with the hybrid logical entity to reduce, at least in part, the mismatched rising and falling slack.

4. The computer-implemented method of claim 1, wherein the hybrid logical entity and the other hybrid logical entity have different voltage thresholds for at least one of their pull-up circuits or their pull-down circuits.

5. The computer-implemented method of claim 1, wherein the pull-up circuit comprises a pair of parallel transistors and the pull-down circuit comprises a pair of stacked transistors, the pair of parallel transistors comprising a pair of p-type field effect transistors, and the pair of stacked transistors comprising a pair of n-type field effect transistors.

6. The computer-implemented method of claim 5, wherein the pair of stacked transistors have a lower voltage threshold than a voltage threshold of the pair of parallel transistors.

7. The computer-implemented method of claim 5, wherein the pair of stacked transistors have a larger leakage duty cycle than a leakage duty cycle of the pair of parallel transistors, and the pair of stacked transistors have a higher voltage threshold than a voltage threshold of the pair of parallel transistors.

8. A computer system for assisting design and manufacture of an electronic circuit, the computer system comprising:
   a memory; and
   a processing circuit in communication with the memory, wherein the computer system is configured to perform a method, the method comprising:
      enhancing design and manufacture of an electronic circuit to meet a design criteria, the enhancing comprising:
         obtaining specified transistor plus voltage threshold limits for a logical entity path for an electronic circuit design;
         obtaining multiple hybrid logical entities, each hybrid logical entity of the multiple hybrid logical entities comprising a pull-up circuit and a pull-down circuit formed of transistors with different transistor types for pull-up versus pull-down, and different voltage thresholds for pull-up versus pull-down;
         incorporating a hybrid logical entity of the multiple hybrid logical entities into the electronic circuit design in place of a uniform voltage threshold logical entity in the path of logical entities of the electronic circuit design to enhance design of the electronic circuit through revision of the design of the electronic circuit to produce a revised electronic circuit design;

wherein the incorporating changes slack in the path of logical entities by one of swapping-up or swapping-down the uniform voltage threshold logical entity via incorporating the hybrid logical entity in place of the uniform voltage threshold logical entity in the path of logical entities of the electronic circuit design to create the revised path of logical entities, and wherein the swapping-down saves energy during operation of the revised path of logical entities and the swapping-up increases slack within the revised path of logical entities;

based on the incorporating of the hybrid logical entity in the path of logical entities of the electronic circuit design to produce the revised electronic circuit design, further incorporating another hybrid logical entity of the multiple hybrid logical entities into the revised path of logical entities in place of another uniform voltage threshold logical entity of the revised path of logical entities to generate a further revised path of logical entities, wherein the further incorporating utilizes the changed slack in the revised path of logical entities in relation to the path of logical entities, and brings the further revised path of logical entities into the obtained specified transistor plus voltage threshold limits for the electronic circuit design; and initiating manufacture of the electronic circuit pursuant, at least in part, to the further revised electronic circuit design.

9. The computer system of claim 8, wherein incorporating the hybrid logical entity of the multiple hybrid logical entities in the electronic circuit design is to meet one or more prespecified transistor type limits for the electronic circuit.

10. The computer system of claim 8, further comprising identifying a path of logical entities in the electronic circuit design with mismatched rising and falling slacks, and wherein the incorporating comprises selectively replacing a uniform voltage threshold logical entity of the path of logical entities with the hybrid logical entity to reduce, at least in part, the mismatched rising and falling slack.

11. The computer system of claim 8, wherein the hybrid logical entity and the other hybrid logical entity have different voltage thresholds for at least one of their pull-up circuits or their pull-down circuits.

12. The computer system of claim 8, wherein the pull-up circuit comprises a pair of parallel transistors and the pull-down circuit comprises a pair of stacked transistors, the pair of parallel transistors comprising a pair of p-type field effect transistors, and the pair of stacked transistors comprising a pair of n-type field effect transistors.

13. A computer program product for assisting design and manufacture of an electronic circuit, the computer program product comprising:

at least one computer-readable storage medium having program instructions embodied therewith, the program instructions being readable by a processing circuit to cause the processing circuit to perform a method comprising:

providing a computer tool to enhance the design of the electronic circuit to meet a design criteria, the computer tool:

obtaining specified transistor plus voltage threshold limits for a logical entity path for an electronic circuit design;

obtaining multiple hybrid logical entities, each hybrid logical entity of the multiple hybrid logical entities comprising a pull-up circuit and a pull-down circuit formed of transistors with different transistor types for pull-up versus pull-down, and different voltage thresholds for pull-up versus pull-down;

incorporating a hybrid logical entity of the multiple hybrid logical entities into the electronic circuit design in place of a uniform voltage threshold logical entity in the path of logical entities of the electronic circuit design to enhance design of the electronic circuit through revision of the design of the electronic circuit to produce a revised electronic circuit design;

wherein the incorporating changes slack in the path of logical entities by one of swapping-up or swapping-down the uniform voltage threshold logical entity via incorporating the hybrid logical entity in place of the uniform voltage threshold logical entity in the path of logical entities of the electronic circuit design to create the revised path of logical entities, and wherein the swapping-down saves energy during operation of the revised path of logical entities and the swapping-up increases slack within the revised path of logical entities;

based on the incorporating of the hybrid logical entity in the path of logical entities of the electronic circuit design to produce the revised electronic circuit design, further incorporating another hybrid logical entity of the multiple hybrid logical entities into the revised path of logical entities in place of another uniform voltage threshold logical entity of the revised path of logical entities to generate a further revised path of logical entities, wherein the further incorporating utilizes the changed slack in the revised path of logical entities in relation to the path of logical entities, and brings the further revised path of logical entities into the obtained specified transistor plus voltage threshold limits for the electronic circuit design; and initiating manufacture of the electronic circuit pursuant, at least in part, to the further revised electronic circuit design.

14. The computer program product of claim 13, further comprising identifying a path of logical entities in the electronic circuit design with mismatched rising and falling slacks, and wherein the incorporating comprises selectively replacing a uniform voltage threshold logical entity of the path of logical entities with the hybrid logical entity to reduce, at least in part, the mismatched rising and falling slack.

* * * * *